(12) United States Patent
Lemaire et al.

(10) Patent No.: US 9,446,491 B2
(45) Date of Patent: Sep. 20, 2016

(54) METHOD FOR TRIMMING A PRE-COATED OPHTHALMIC EYEGLASS LENS

(75) Inventors: Cedric Lemaire, Charenton-le-Pont (FR); Cedric Begon, Charenton-le-Pont (FR); Konogan Baranton, Charenton-le-Pont (FR); Ahmed Haddadi, Charenton-le-Pont (FR); Patrice Szymanski, Charenton-le-Pont (FR); Gerard Poirrier, Charenton-le-Pont (FR)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 209 days.

(21) Appl. No.: 13/806,349
(22) PCT Filed: Jul. 1, 2011
(86) PCT No.: PCT/FR2011/000386
§ 371 (c)(1),
(2), (4) Date: Dec. 21, 2012
(87) PCT Pub. No.: WO2012/007654
PCT Pub. Date: Jan. 19, 2012

(65) Prior Publication Data
US 2013/0095733 A1    Apr. 18, 2013

(30) Foreign Application Priority Data

Jul. 13, 2010    (FR) ..................................... 10 02955

(51) Int. Cl.
*B24B 9/14*    (2006.01)
*B24B 1/00*    (2006.01)
(Continued)

(52) U.S. Cl.
CPC . *B24B 1/00* (2013.01); *B24B 9/14* (2013.01); *B24B 9/148* (2013.01); *B24B 27/0076* (2013.01); *B29D 11/00932* (2013.01)

(58) Field of Classification Search
CPC ......... B24B 9/148; B24B 9/00; B24B 9/107; B24B 9/14; B24B 1/00; B24B 27/0076; B24B 19/03; B24B 13/0055; B29D 11/00932; B29D 11/00836; B29D 11/00778; B29D 11/0074; B23C 3/34; B23C 3/28; B29L 2011/0016

USPC ................. 451/44, 69, 285–290, 43; 65/44; 264/2.7, 1.7; 351/159.67; 438/690.114
See application file for complete search history.

(56) References Cited

U.S. PATENT DOCUMENTS 2,231,994 A * 2/1941 Flattem ............................. 33/28
2,410,443 A * 11/1946 Hoffer ..................... C03B 33/04
33/28

(Continued)

FOREIGN PATENT DOCUMENTS

WO    2007/128903 A1    11/2007
WO    2008/043910 A1    4/2008

OTHER PUBLICATIONS

Lens Basics, Donald E. Simanek,https://www.lhup.edu/~dsimanek/scenario/lenses.htm, Jun. 1997, access date: Sep. 14, 2015.*

(Continued)

*Primary Examiner* — Joseph J Hail
*Assistant Examiner* — Arman Milanian
(74) *Attorney, Agent, or Firm* — Young & Thompson

(57) ABSTRACT

Method of shaping an ophthalmic eyeglass lens presenting two main optical working faces and including firstly a substrate made of a first material and presenting two main faces corresponding to the two main faces of the lens, and secondly at least one coating film made of a material distinct from that of the substrate, the coating film being previously secured on at least one of the main faces of the substrate, includes:
- cutting the lens by machining with a first tool over at least the thickness of the previously secured coating film, to define internally a working central portion of the coating film that presents a reduced outline;
- trimming the edge face of the substrate along the desired outline by machining with a second distinct tool, without machining the working central portion; and
- finishing the edge face of the substrate without machining the working central portion.

20 Claims, 3 Drawing Sheets

(51) Int. Cl.
*B24B 27/00* (2006.01)
*B29D 11/00* (2006.01)

(56) References Cited

U.S. PATENT DOCUMENTS

| | | | | |
|---|---|---|---|---|
| 3,030,859 A * | 4/1962 | Elliott, Jr. | ........ | B29D 11/00942 |
| | | | | 264/1.1 |
| 3,063,340 A * | 11/1962 | Dillon | ...................... | 351/159.67 |
| 3,087,285 A * | 4/1963 | Lissac | ........................... | 451/240 |
| 3,170,374 A * | 2/1965 | Clar | ............................... | 409/84 |
| 3,313,031 A * | 4/1967 | Lowe | ...................... | B24B 9/146 |
| | | | | 33/28 |
| 3,894,361 A * | 7/1975 | Georgiadis | ............... | B24B 9/14 |
| | | | | 451/240 |
| 3,899,314 A * | 8/1975 | Siegmund | ......................... | 65/23 |
| 3,905,163 A * | 9/1975 | Kleiber | ................... | B24B 13/00 |
| | | | | 359/819 |
| 3,981,709 A * | 9/1976 | Kondo | ..................... | G02C 7/02 |
| | | | | 451/240 |
| 4,156,328 A * | 5/1979 | Keane, Jr. | ....................... | 451/43 |
| 4,989,967 A * | 2/1991 | Matsuda | ................... | G02C 7/12 |
| | | | | 351/159.63 |
| 5,363,597 A * | 11/1994 | Gottschald | ............... | B24B 9/14 |
| | | | | 451/240 |
| 5,451,281 A * | 9/1995 | Lipman | ............ | B29D 11/00932 |
| | | | | 156/101 |
| 5,512,004 A * | 4/1996 | Strope | .................. | G05B 19/184 |
| | | | | 451/43 |
| 5,775,973 A * | 7/1998 | Watanabe | ............. | B24B 47/225 |
| | | | | 451/10 |
| 5,859,685 A * | 1/1999 | Gupta | ...................... | G02C 7/02 |
| | | | | 264/2.7 |
| 5,868,603 A * | 2/1999 | Allaire | ...................... | B24B 9/10 |
| | | | | 451/29 |
| 5,908,348 A * | 6/1999 | Gottschald | ............ | B24B 47/225 |
| | | | | 451/11 |
| 5,934,982 A * | 8/1999 | Vianello | ................... | B24B 9/10 |
| | | | | 451/119 |
| 6,144,500 A * | 11/2000 | Iwaki et al. | .................. | 359/719 |
| 6,558,586 B1 * | 5/2003 | Padiou et al. | ................. | 264/1.7 |
| 6,609,956 B2 * | 8/2003 | Margaria | .................. | B24B 9/10 |
| | | | | 451/44 |
| 6,743,486 B1 * | 6/2004 | Miyazawa | ................ | B24B 9/14 |
| | | | | 351/159.69 |
| 6,910,403 B1 * | 6/2005 | Ishikawa | ............ | H01L 21/6836 |
| | | | | 125/11.15 |
| 8,128,463 B2 | 3/2012 | Lemaire et al. | | |
| 2003/0181133 A1 * | 9/2003 | Siders | ....................... | B24B 1/00 |
| | | | | 451/5 |
| 2004/0097168 A1 * | 5/2004 | Igarashi | .................... | B23C 3/12 |
| | | | | 451/5 |
| 2004/0257525 A1 * | 12/2004 | Moravec | ................ | G02C 7/12 |
| | | | | 351/159.62 |
| 2006/0217036 A1 * | 9/2006 | Meunier | ............ | B24B 27/0076 |
| | | | | 451/5 |
| 2006/0234607 A1 * | 10/2006 | Kimura | ................... | B24B 13/01 |
| | | | | 451/42 |
| 2007/0097525 A1 * | 5/2007 | Guillermin | ............ | B24B 9/148 |
| | | | | 359/819 |
| 2007/0167112 A1 * | 7/2007 | Siders et al. | ....................... | 451/5 |
| 2007/0202775 A1 * | 8/2007 | Shibata | .................... | B24B 9/14 |
| | | | | 451/5 |
| 2008/0009230 A1 * | 1/2008 | D'Agostino | .................. | 451/240 |
| 2008/0058983 A1 * | 3/2008 | Schaeffer | ................. | B23C 3/34 |
| | | | | 700/160 |
| 2009/0068932 A1 * | 3/2009 | Lemaire | ................ | B24B 9/148 |
| | | | | 451/43 |
| 2010/0093265 A1 * | 4/2010 | Lemaire | .................... | B24B 9/14 |
| | | | | 451/294 |
| 2010/0097568 A1 * | 4/2010 | Asai et al. | ...................... | 351/166 |
| 2010/0283967 A1 * | 11/2010 | Dubois | ................ | G02C 13/003 |
| | | | | 351/159.76 |
| 2010/0290003 A1 * | 11/2010 | Dubois | ............... | G06F 17/5004 |
| | | | | 351/159.76 |
| 2011/0097852 A1 * | 4/2011 | Sekiya | ...................... | B24B 1/00 |
| | | | | 438/114 |

OTHER PUBLICATIONS

International Search Report, dated Nov. 9, 2011, from corresponding PCT application.

* cited by examiner

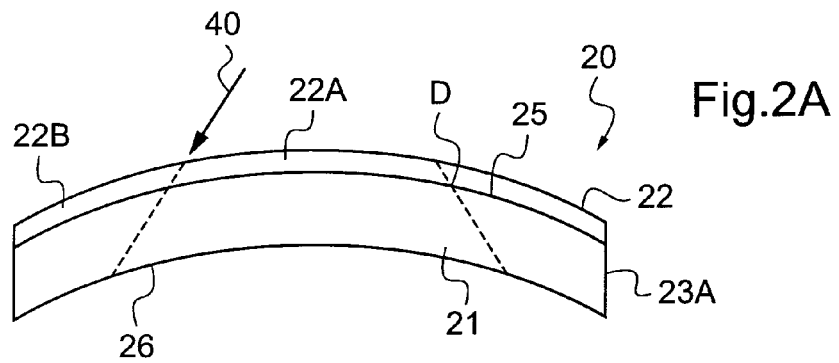
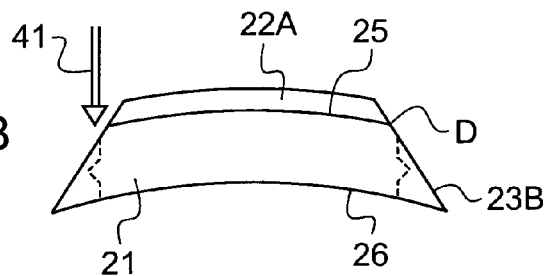
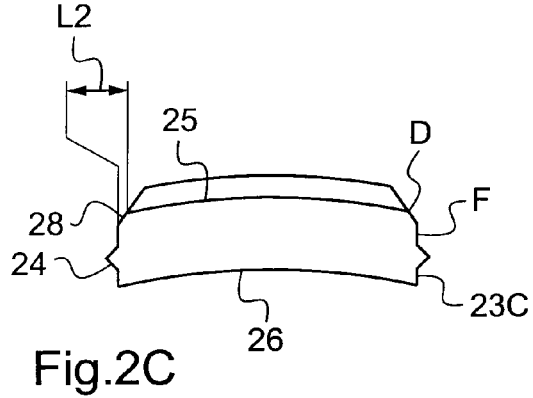
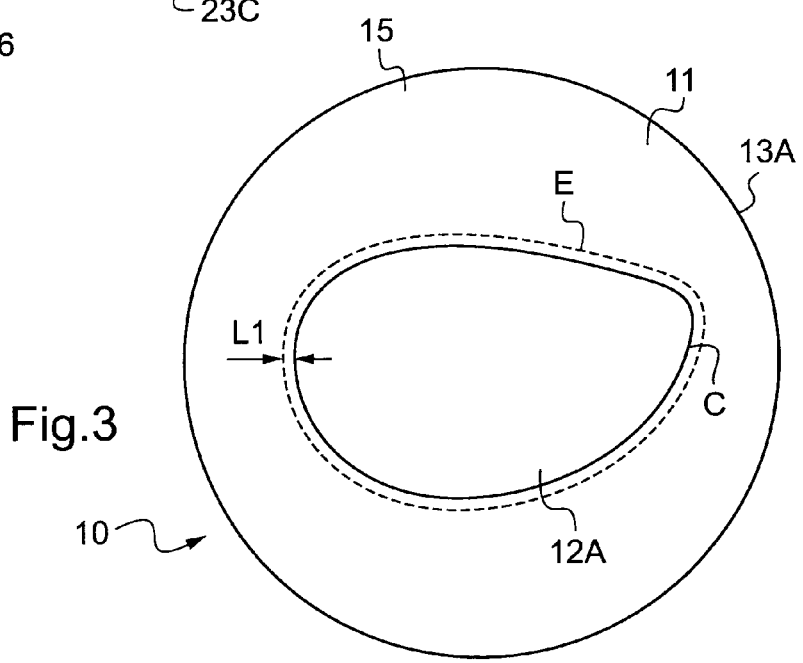

METHOD FOR TRIMMING A PRE-COATED OPHTHALMIC EYEGLASS LENS

TECHNICAL FIELD TO WHICH THE INVENTION RELATES

The present invention relates in general to shaping ophthalmic lenses, and more particularly to a method of shaping an ophthalmic lens that is coated in a film.

TECHNOLOGICAL BACKGROUND

Certain ophthalmic lenses are provided on one of their faces with a coating layer in the form of a film that is fitted onto the substrate of the lens, e.g. that is adhesively bonded on the substrate.

Such films provide better comfort for the wearer and better performance for the lens.

At present, preparing such an ophthalmic lens having a coating film so that it is ready for mounting in a frame selected by the wearer, i.e. shaping the lens to have an outline suitable for mounting in the frame, requires numerous steps to be performed that are difficult to implement.

It is not possible to shape the lens together with its film in conventional manner using a grindwheel. The film is fragile and during such a shaping operation it would be subjected to unsticking and/or delamination, i.e. separation of the various layers of the film, which is not acceptable.

OBJECT OF THE INVENTION

In order to remedy the above-mentioned drawbacks of the prior art, the present invention provides a method of shaping an ophthalmic eyeglass lens to have a desired outline, the lens presenting two main optical working faces and comprising firstly a substrate made of a first material and presenting two main faces corresponding to the two main faces of the lens, and secondly at least one coating film made of a material distinct from that of said substrate, said coating film being previously secured on at least one of the main faces of the substrate. The method comprises the following steps:

a) step of cutting the lens by machining it with a first tool over at least the thickness of the coating film previously secured on the substrate, this cutting defining internally a working central portion of the coating film that presents a reduced outline that is closed and determined as a function of said desired outline;

b) a step of trimming the edge face of the substrate along said desired outline by machining by means of a second tool distinct from the first tool, without machining the working central portion of the coating film; and c) at least one subsequent step of finishing the edge face of the substrate by machining without machining the working central portion of the coating film.

The method allows the lens with its coating film to be shaped directly. The coating film may comprise one or more layers and may present a structure that is continuous or that is microstructured. It is secured in temporary or permanent manner on the corresponding face of the lens. This face of the lens may also present other surface treatments in the form of coating layers.

Step a) is performed using a cutting tool that is different from the trimming tool of the grindwheel or cutter type that is used in step b), the tool being selected to avoid causing cohesion defects to appear between the film and the substrate or between the different portions of the film, and in particular to avoid unsticking and/or delamination of the coating film.

In addition, during step a), the lens is cut through at least the thickness of the film along a reduced outline that is closed and designed as a function of the desired outline for the lens in such a manner that the reduced outline is included within the desired outline and lies at a determined distance from the desired outline, which determined distance is greater than a threshold value.

During step b), the desired outline to which the lens is machined is thus larger than the reduced outline to which the coating film is cut in step a). In this way, the working central portion of the coating film is not cut during step b), thereby avoiding unsticking or delamination of the film.

This shaping method limits manipulations of the coating film and of the substrate, thus making the method simple and fast for the operator.

In addition, the positioning of the coating film relative to the substrate of the lens is accurate and the appearance of the resulting lens is thus satisfactory. The great accuracy with which the film is positioned is particularly advantageous with films that present properties that are not uniform (that vary in space) and that must therefore be positioned very accurately on the lens. This applies for example to coating films that present a varying index of refraction.

The retention and the finishing of the coating film on the base of the lens is thus improved.

According to another characteristic of the method of the invention that is advantageous and not limiting, during step b), beveling and/or grooving and/or chamfering operations are performed on the substrate of the lens.

This enables the preparation of the lens for mounting in the eyeglass frame selected by the wearer to be fast and easy.

Without going beyond the ambit of the invention, it is possible to perform step b) after step a) or, conversely, step a) after step b), or indeed to perform steps a) and b) simultaneously, at least in part.

Other characteristics of the method of the invention that are advantageous and non-limiting are the following:
  step a) is performed by means of a cutter;
  step a) is performed by means of a sharp point;
  step b) is performed by means of a grindwheel;
  during step a), said substrate of the lens is machined over at least a fraction of its thickness;
  during step a), the substrate of the lens is machined over a fraction of its thickness that is less than or equal to 30 percent of she total thickness of said substrate;
  during step a), the coating film and at least a portion of the substrate are cut obliquely;
  said oblique cutting is performed through the total thickness of the coating film and of the substrate; and
  the coating film and the substrate of the lens are cut in such a manner that at least 80 percent of the outline of the working central portion of the coating film is spaced apart from the edge of the face of the lens on which the coating film is secured by no more than 1 millimeter.

DETAILED DESCRIPTION OF AN EMBODIMENT

The following description given by way of non-limiting example and with reference to the accompanying drawings makes it clear what the invention consists in and how it can be reduced to practice.

In the accompanying drawings:

FIGS. 1A, 1B, and 1C are diagrammatic section views, of the ophthalmic lens at various successive steps during its shaping in a first implementation of the method in accordance with the invention;

FIGS. 2A, 2B, and 2C are diagrammatic section views of the ophthalmic lens at various successive steps during its shaping in a second implementation of the method in accordance with the invention;

FIG. 3 is a diagrammatic plan view of the lens shown in FIG. 1B; and

In the description below, numerical references that designate elements relating to a given implementation are separated by commas, whereas numerical references designating elements relating to different implementations are separated by semicolons.

Figure 1A:
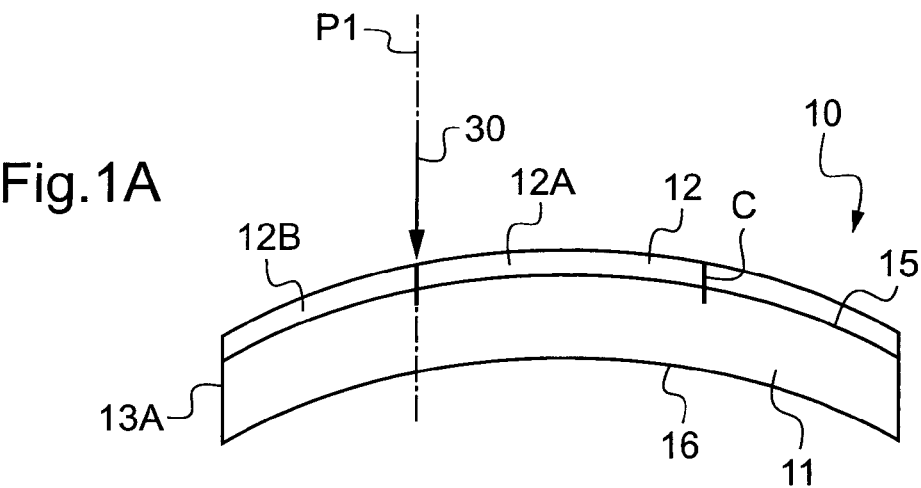
Figure 1B:
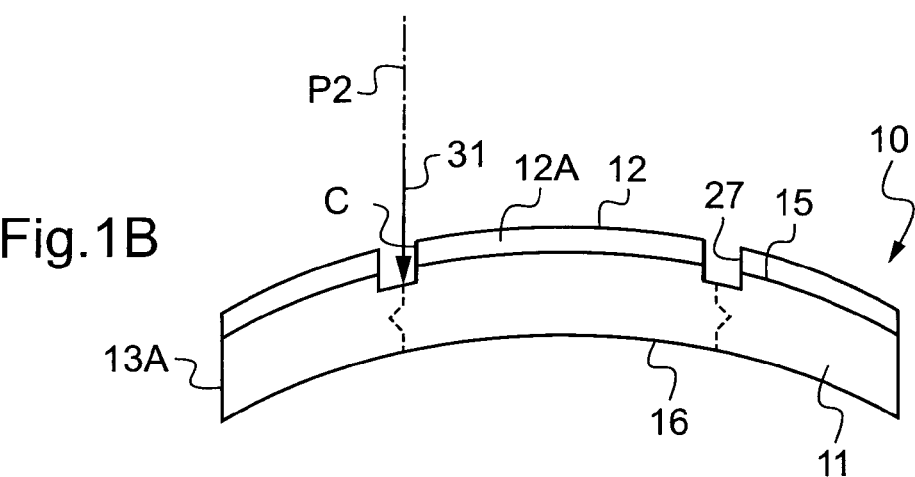
Figure 1C:
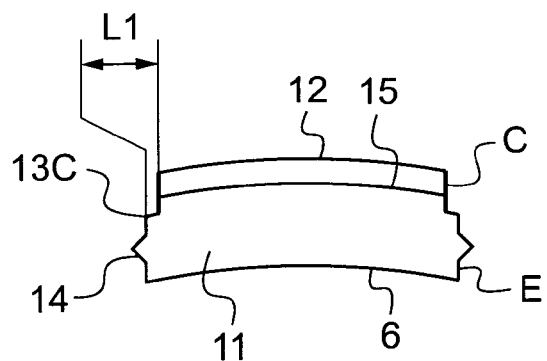

In FIGS. 1A, 1B, 1C; 2A, 2B, 2C, there can be seen an ophthalmic lens 10; 20 comprising a substrate 11; 21 covered in a coating film 12; 22. The ophthalmic lens 10; 20 may be a correcting lens that is converging, diverging, and/or toric, or a non-correcting lens in which the working optical faces are parallel.

The substrate 11; 21 is made of a first material, e.g. a mineral glass or an organic glass, i.e. a polymer.

It presents two main faces 15, 16; 25, 26 corresponding to two main faces of the ophthalmic lens 10; 20.

Before shaping to have a lens with the desired outline E; F, which outline corresponds to the frame selected by the wearer and in which the lens 10; 20 is to be mounted, the initial edge face 13A; 23A of the lens is circular (FIGS. 1A, 2A, and 3). The lens 10; 20 is to be shaped to have the shape of the rim that corresponds to the eyeglass frame 10; 20 so as to be capable of being engaged therein.

The term "desired" outline E; F designates the intersection between the edge face of the lens 10; 20 that is to be inserted in the rim of the selected frame and the working face on which the film 12; 22 is secured.

As shown in FIGS. 1C and 2C, the lens is shaped more precisely so as to present on its final edge face 13C; 23C an engagement ridge 14; 24 (or bevel). The engagement ridge 14; 24 is shown herein as having a V-shaped section, with a top edge that runs along the final edge face 13C; 23C of the lens 10; 20 and two flanks, namely a front flank and a rear flank on either side of the top ridge.

In a variant, the edge face of the ophthalmic lens may be shaped so as to present a profile of a different shape, e.g. of rectangular shape or of circularly arcuate shape.

The coating film 12; 22 is made of a second material that is different from the material of said substrate 11; 21.

By way of example, the second material is a transparent plastics material. By way of example, this transparent plastics material is a polymer material presenting physicochemical properties or optical properties of birefrigence, polarization, or absorption in certain wavelength ranges such as ultraviolet wavelengths or certain visible wavelengths so as to give a particular tint to the lenses, or indeed reflective or hydrophobic properties.

The film 12; 22 may also include one or more coating layers, e.g. presenting anti-impact, anti-scratching, anti-reflection, or anti-dirtying properties.

The film 12; 22 is secured on one of the main faces of the substrate 11; 21, specifically the front main face 15; 25 of the substrate 11; 21, e.g. by adhesive.

In remarkable manner, by using the shaping method of the invention, the complete lens 10; 20 is shaped, i.e. both the substrate 11; 21 and the film 12; 22 secured on its front face 15; 25.

The method comprises a plurality of distinct cutting steps.

In a first step a), the lens 10; 20 is cut using a first tool 30; 40 (FIGS. 1A and 2A) to cut through at least the thickness of the coating film 12; 22 secured on said substrate 11; 21 along an intermediate outline referred to below as the "reduced" outline C; D drawn in dashed lines in FIGS. 1A and 2A and in a continuous line in FIG. 3.

The reduced outline C; D is closed and it is determined as a function of the desired final outline E; F of the lens 10; 20 so as to be included within said desired outline. The reduced outline C; D is thus of smaller size than the desired outline E; F of the lens. It can thus be said that the reduced outline C; D is reduced relative to the desired outline. The reduced outline C; D is also, by definition, reduced relative to the initial outline of the lens prior to shaping, which corresponds to the outline of the initial edge face 13A; 23A of the lens 10; 20.

This reduced outline C; D defines on its inside a working central portion 12A; 22A of the coating film 12; 22, and on its outside it defines a peripheral portion 12B; 22B. In other words, during step a), the cutting operation safeguards said central portion 12A; 22A of the coating film 12; 22 that is situated inside the reduced outline 12A; 22A.

In a second step b), the substrate 11; 21 of the lens 10; 20 is trimmed by machining with a second tool 31; 41 that is distinct from the first tool 30; 40, without machining the working central portion 12A; 22A of the coating film 12; 22, as shown with dashed lines in FIGS. 1B, 2B, and 3.

In a first implementation of the invention as shown in FIGS. 1A, 1B, 1C, and 3, in the first step a), the lens 10 is cut through the thickness of the coating film 12 and through a portion of the thickness of the substrate 11 of the lens.

A furrow 27 hollowed out in the coating film and in a portion of thickness of the substrate of the lens is thus formed along the circumference of the central portion of the coating film.

This portion of the thickness of the substrate is preferably small relative to the total thickness of the substrate of the lens. By way of example, it corresponds to a thickness that is less than or equal to 30 percent of the total thickness of the substrate.

It preferably corresponds to a thickness that is less than or equal to one millimeter.

The first tool 30 used for performing this step is represented diagrammatically by an arrow 30 in FIG. 1A, and is constituted for example by a frontal milling cutter or by a drill bit, either of which is small in diameter. The small diameter is preferably less than 5 millimeters. The first tool 30 could also be a sharp point.

The term "diameter" is used herein for a tool to mean the diameter of the cutting surface of the tool generated by a sharp edge or a sharp surface of she tool as it rotates about an axis of rotation of the tool.

These tools present the advantage of not damaging the coating film 12. In particular, they do not cause the film to become delaminated.

The initial edge face 13A of the lens 10 is not modified during this step a).

Figure 4:
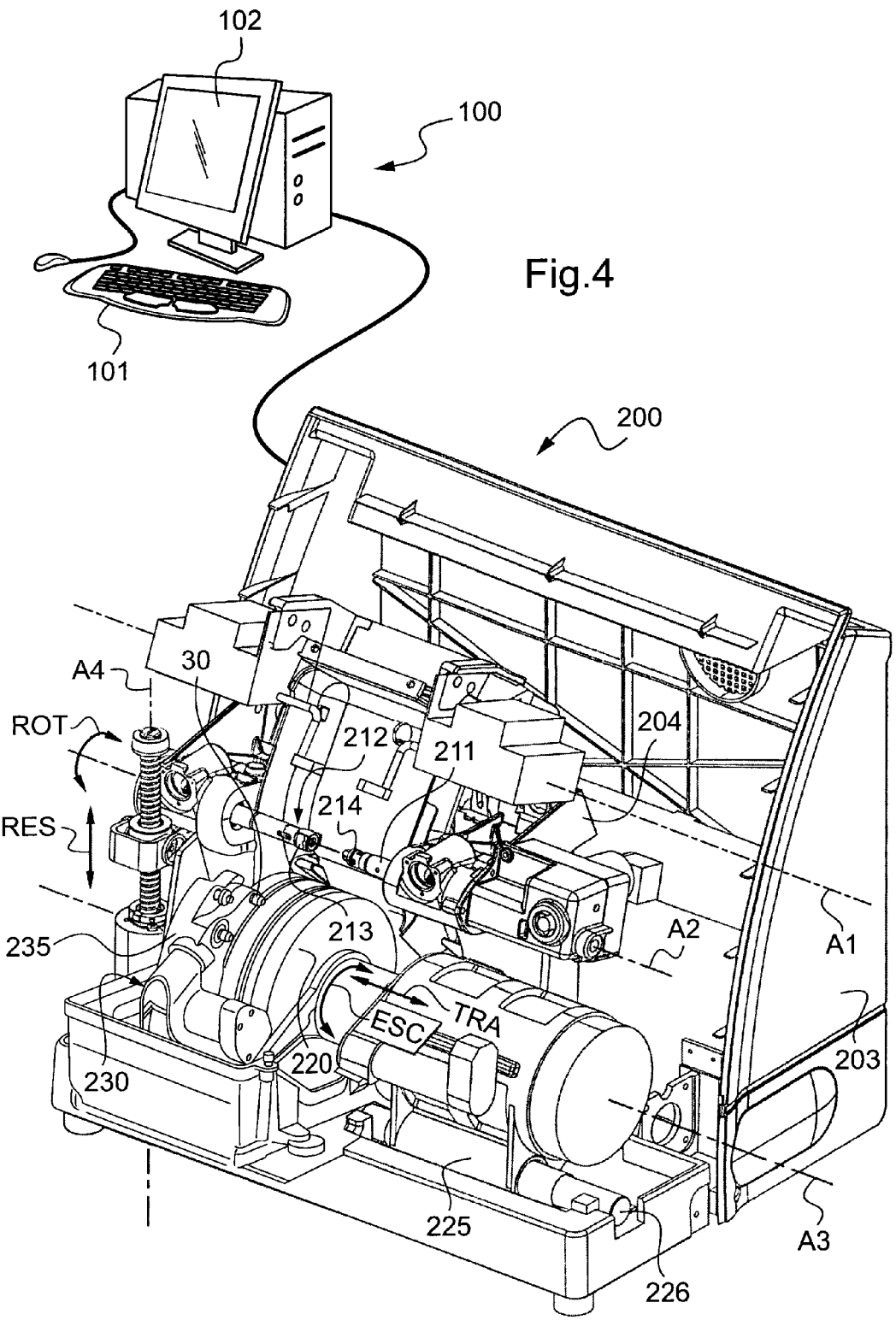
FIG. 4 is a diagrammatic perspective view of an edger device used for implementing the method of the invention.

In practice, and by way of example, the operator places the lens 10 in a machining device 200 of known type, such as that described in document WO 2008/043910. Such a device, as shown in FIG. 4, comprises for example:

a rocker 204 that is mounted on a structure 203 to pivot about a reference axis A1, in practice a horizontal axis, and including means for supporting the lens 10 enabling the lens 10 to be driven in rotation about a blocking axis A2 that is substantially perpendicular to the mean plane of the lens and parallel to the axis A1;

at least one grindwheel 220 that is constrained to rotate on a grindwheel axis A3 parallel to the reference axis A1, and that is also driven in rotation by a motor; and a finishing module 235 that is mounted so rotate about the grindwheel axis A3, and that carries said first tool 30; 40 and possibly also means for drilling the ophthalmic lens 10.

This machining device 200 is controlled by an electronic and computer device 100. The electronic and computer device 100 includes data acquisition and display means 101 typically comprising a keyboard 101 and a screen 102 adapted to displaying a graphics interface, control means suitable for controlling the various degrees of freedom of the machining device 200, and an operating system associated with a software application adapted to controlling the various components.

The rocker 204 has a lens support, e.g. constituted by two shafts 211 and 212 for clamping and driving the lens 10 in rotation about a blocking axis A2.

These two shafts are in alignment with each other along the blocking axis A2 parallel to the reference axis A1. Each of the shafts 211 and 212 possesses a free end facing the other free end, which free ends are fitted with respective blocking chucks 213, 214 for blocking the ophthalmic lens 10.

A first one 212 of the two shafts is stationary in translation along the blocking axis A2. In contrast, the second one 211 of the two shafts is movable in translation along the blocking axis A2 in order to clamp the ophthalmic lens 10 in axial compression between the two blocking chucks 213 and 214.

The two shafts 211 and 212 are driven in rotation synchronously by a motor (not shown) via a common drive mechanism (not shown) installed on the rocker 204. This common mechanism for driving the shafts synchronously in rotation is of conventional, known type.

The rotation ROT of the shafts 211 and 212 is controlled by the electronic and computer device 100.

The machining device 200 also includes a set of grindwheels for edging and shaping the lens. This set of grindwheels includes the shaping and beveling grindwheel 220, which grindwheel is constrained to rotate on the grindwheel axis A3 parallel to the blocking axis A2 and is also driven in rotation by a specific motor. The shaping and beveling grindwheel 220 presents a peripheral edge face that is generally cylindrical about the grindwheel axis A3 and that includes two beveling grooves of V-shaped profile.

The set of grindwheels is fitted on a common shaft that extends along the grindwheel axis A3 and that serves to drive it in rotation during the operation of shaping and beveling the ophthalmic lens 10. This common shaft, which is not visible in the figures, is caused to rotate by an electric motor under the control of the electronic and computer device 100.

The set of grindwheels is also movable axially in translation along the grindwheel axis A3 and this movement in translation is controlled by a controlled motor. Specifically, the entire set of grindwheels together with its shaft and its motor are carried by a carriage 225 that is itself carried on slides 226 secured to the structure 203 to slide along the blocking axis A2. This axial freedom of movement, of the carriage 225 is referred to as "transfer" and is written TRA in FIG. 4. This transfer is controlled by the electronic and computer device 100.

In order to enable the spacing between the blocking axis A2 and the grindwheel axis A3 of the shaping and beveling grindwheel 220 to be adjusted dynamically, use is made of she ability of the rocker 204 to pivot about the rocker axis A1.

This pivoting produces a movement effect, here a substantially vertical movement of the ophthalmic lens 10 clamped between the shafts 211 and 212, causing the lens to move towards or away from the grindwheel 220 along a reproduction axis A4. This freedom of movement that enables the desired beveling shape to be reproduced is programmed in the electronic and computer device 100 and is referred to as reproduction, being written RES in FIG. 4.

The machining device 200 shown in FIG. 1 also has a machining arm 230 provided with a finishing module 235 that carries additional machining tools for shaping and finishing the ophthalmic lens 10, and a support that connects the finishing module 235 to the structure 203 of the machining device 200.

The machining arm 230 presents a degree of freedom to move in a direction substantially transverse relative to the blocking axis A2 and the reproduction axis A4. This transverse degree of freedom is referred to as retraction and is written ESC. Specifically, retraction consists in pivoting the machining arm 230 about the grindwheel axis A3.

Because of the transfer and retraction freedoms of movement of the machining arm 230, the finishing module 235 presents an adjustable position that enables the additional machining tools to be moved towards or away from the lens blocked by the shafts 211 and 212.

In operation, the electronic and computer device 100 controls the relative movements of the rocker 204, of the lens 10, and of the finishing module 235 so that the first tool 30 cuts the film 12 along the reduced outline C.

By way of example, the reduced outline C is determined by the electronic and computer device 100 as a function of the characteristics of the frame selected by the wearer and as a function of the morphological characteristics of the wearer.

The reduced outline C is also determined as a function of the cutting characteristics of the first tool that is used for performing step a), so that the desired outline E for the lens 10 is situated in the furrow 27 formed all around this reduced outline C in the lens.

In a variant, during step a), the lens is cut solely through the thickness of the coating film. The substrate of the lens is then not cut during this step.

Thereafter, in step b), the operator machines the substrate 11 of the lens 10 to have the desired outline E of the lens, as shown in FIG. 1B. As stated above, the desired outline E corresponds to the outline of the rim of the frame in which the lens is to be mounted.

The second tool 31 used by the operator for performing this step b) and represented diagrammatically in FIG. 1B by an arrow 31, is constituted for example by the shaping and beveling grindwheel 220 of FIG. 4. The grindwheel 220 shown presents a large diameter, i.e. a diameter that is close to or greater than the diameter of the lens. Nevertheless, it is also possible to use a grindwheel of medium diameter, e.g. a few centimeters. In a variant, it is also possible to use a cutter of small or medium diameter.

The desired outline E of the lens is slightly greater than the reduced outline C of the coating film 12, with the central portion 12A of the film 12 that is bonded onto the substrate 11 being left unaffected by this machining. This avoids any delamination of the central portion 12A of the film 12.

The reduced outline C of the coating film 12 preferably follows the desired outline B closely, as shown in FIGS. 1C and 3. The reduced outline C of the film 12 is preferably calculated so that the distance L1 (FIGS. 1C and 3) between the reduced outline C of the film 12 and the edge of the shaped edge face 13C of the lens 10 is less than or equal to a maximum of one millimeter (FIG. 1C) over at least 80 percent of the circumference of the lens 10 once shaped, and preferably over all of its circumference.

During a step c), the operator also proceeds to perform finishing operations on the lens, e.g. beveling, grooving, and chamfering operations on the substrate 11 of the lens 10.

By way of example, during step c) that in this example is performed simultaneously with step b), the operator makes the engagement ridge 14 on the final edge face 13C of the lens 10.

The peripheral portion 21B of the coating film 12 is automatically eliminated at the end of the two steps a) and b), as shown in FIG. 1C.

In the first implementation described, the two cutting steps are performed along respective cutting edges or planes P1, P2 that are substantially parallel, to the blocking axis A2 of the lens 10, i.e. perpendicular to the mean plane of the lens.

In a variant, it is possible to envisage that the cutting edge or plane in each of the steps is inclined relative to the axis A2.

For this purpose, it is possible to envisage using a tool having its axis of rotation parallel to the blocking axis of the lens and having its cutting edge or surface inclined relative to the axis of rotation, or else using a tool having its cutting edge or surface parallel to said axis of rotation with the axis of rotation being inclined relative to the blocking axis of the lens.

For example, the cutting edge or surface along which the first tool cuts the coating film may be inclined at an angle lying in the range 10 degrees to 60 degrees relative no the blocking axis A2 so that the diameter of the central portion of the cut film increases going from the outside face of the film towards the face of the film that is bonded on the ophthalmic lens.

Steps a) and b) are then performed in the manner described above. The "reduced" outline of the film then designates the edge of the central portion of the film that is in contact with the substrate.

It is also possible to envisage performing step b) before step a). During step b), a thickness of the substrate is thus machined that is less than or equal to the total thickness of the substrate. Thereafter the film is cut together with the portion of the substrate that was not cut during step b) so that the two cuts join each other. The reduced outline of the film may thus be in register with the desired outline for cutting the lens: there is then no distance between the edge of the edge face of the substrate and the outline of the film, thereby improving the appearance of the front face of the lens.

In a second implementation of the method of the invention, as shown in FIGS. 2A to 2C, during step a), the operator machines the entire thickness of the coating film 22 and of the substrate 21 of the lens 20, as represented by dashed lines in FIG. 2A.

More precisely, during step a), the operator cuts the coating film 22 and the substrate 21 obliquely so that the lens 20 presents a diameter that increases going from the front face of the lens 20 carrying the film 22 towards the other face of the lens 20 after this cutting step a) has been performed.

This oblique cutting may be performed so as to cut the film 22 with its reduced outline D. The "reduced" outline D of the film 22 is used to mean the edge of the central portion 22A of the film 22 that is in contact with the substrate 21.

For this purpose, and as shown in FIG. 2B, the lens 20 is machined so that the edge face 23B of the lens 20 after this first step a) forms an angle lying in the range 30 degrees to 60 degrees with the mean plane of the lens 20.

As in the first implementation, the first tool 40 used for performing this step a) and represented diagrammatically in FIG. 2A by an arrow comprises a frontal milling cutter, a small-diameter drill bit, or indeed a sharp point, so as to avoid damaging the film 22 during cutting.

As explained for the first implementation, it is possible to envisage performing this oblique cut by using a tool having its axis of rotation parallel to the blocking axis of the lens and having its cutting edge or surface inclined relative to its axis of rotation, or else using a tool having its cutting edge or surface parallel to the axis of rotation while its axis of rotation is inclined relative to the blocking axis of the lens.

In practice, the lens 20 is placed in an edger device similar to that described for the first implementation and shown in FIG. 4. The first tool 40 is carried in the same manner by the finishing module of the edger device.

The peripheral portion 22B of the coating film 22 is automatically eliminated at the end of step a), as shown in FIG. 2B.

The shape of the edge face 23B of the lens 20 after step a) is determined by the electronic and computer device of the edger device as a function of the reduced outline D desired for the film 22, as a function of the shape of the frame selected by the wearer, and as a function of the morphological characteristics of the wearer.

Thereafter, in a step b), the operator machines at least a portion of the substrate 21 of the lens 20 to have the desired outline F of the lens, as shown in FIG. 2B. As mentioned above, the desired outline F corresponds to the outline of the rim of the frame in which the lens is to be mounted.

Step b) is performed using the second tool 41 represented diagrammatically by an arrow 41 in FIG. 2B. By way of example, this second tool 41 is a grindwheel similar to the shaping and beveling grindwheel 220 shown in FIG. 4.

In step b), the cutting is straight and the cutting edge or surface of the second tool that is used is parallel to the blocking axis of the lens.

The desired outline F extends at a distance from the reduced outline D of the film 22. Thus, the central portion 22A of the film 22 is not machined during step b). This avoids any delamination of this central portion of the film 22.

The reduced outline D of the coating film 12 preferably follows the desired outline F of the shape lens 20 closely, as shown in FIG. 2C. The distance L2 between the reduced outline D of the film 22 and the edge of the final edge face 23C of the shape lens 20 is less than or equal to one millimeter (FIG. 2C) over at least 80 percent of the circumference of the shape lens 20, and preferably over its entire circumference. This improves the appearance of the lens.

As in the first implementation, the electronic and computer device of the edger device also determines the shape of the final edge face 23C of the lens. It controls the relative movements of the rocker, of the finishing module, and of the lens in order to perform the two steps a) and b).

As in the first implementation, during a step c), that may be performed in part simultaneously with the step b), the operator advantageously performs finishing operations on the lens 20. In this example, an engagement ridge 24 is formed along the shape edge face 23C of the lens 20. In addition, a chamfer 28 connecting the final edge face 23C with the front face of the film 22 is formed by cutting the film 22 and the substrate 21 obliquely during the step a). Finishing the lens 20 can thus be performed quickly and cleanly.

In a variant, it is possible to envisage performing step b) before step a). Only a portion of the thickness of the substrate of the lens is then machined, so as to avoid damaging the film 22. Thereafter, the operator cuts the film obliquely together with at least a portion of the thickness of the substrate that has not previously been machined.

The present invention is not limited in any way to the implementations described and shown, and the person skilled in the art will know how to apply any variant in accordance with the spirit of the invention.

The use of different tools, e.g. one selected from the frontal milling cutter, the drill bit, the sharp point, and the other from a grindwheel or a plain milling cutter, in order to perform step a) and step b), makes it possible in particular to envisage performing these two steps simultaneously, at least in part. For this purpose, is suffices to control the tools so that they travel around the circumference of the lens in succession, one of the two tools being slightly offset relative to the other so as to perform work at a given radius of the lens.

In a variant, the film may be secured to the rear face of the substrate. The method is unchanged. The rear face of the lens then acts as the front face of the lens as described above.

By way of example, it is possible to envisage the operator placing adhesive along the circumference of the central portion 12A of the coating film 12 corresponding to said reduced outline C, in order to prevent any subsequent separation of the film after performing step a).

When a portion of the thickness of the substrate of the lens is cut in addition to the coating film, a furrow hollowed out in the substrate of the lens is formed along the circumference of the central portion of the coating film and the adhesive then penetrates into the furrow as hollowed out in this way.

The invention claimed is:

1. A method of shaping an ophthalmic eyeglass lens to have a desired outline corresponding to an outline of a frame in which the lens is to be mounted, the lens presenting two main curved optical working faces and comprising firstly a substrate made of a first material and presenting two main curved faces corresponding to the two main faces of the lens, and secondly at least one coating film made of a material distinct from that of said substrate, said coating film being previously secured on at least one of the main faces of the substrate, the method comprising the following steps:
   a) a step of forming the edge face of the coating film by cutting the lens by machining the lens with a first tool over at least the thickness of the coating film previously secured on the substrate this cutting defining internally a working central portion of the coating film that presents a reduced outline of smaller size than the desired outline, this reduced outline being closed and determined as a function of said desired outline so as to be included within said desired outline;
   b) a step of trimming the edge face of the substrate along said desired outline by machining by means of a second tool distinct from the first tool, without machining the working central portion of the coating film; and
   c) at least one subsequent step of finishing the edge face of the substrate by machining without machining the working central portion of the coating film.

2. The method according to claim 1, wherein during step c), beveling and/or grooving and/or chamfering operations are performed on the substrate of the lens.

3. The method according to claim 1, wherein steps a) and b) are performed sequentially, one after the other, in either order.

4. The method according to claim 1, wherein steps a) and b) are performed simultaneously, at least in part.

5. The method according to claim 1, wherein step a) is performed by means of a cutter.

6. The method according to claim 1, wherein step a) is performed by means of a sharp point.

7. The method according to claim 1, wherein step b) is performed by means of a grindwheel.

8. The method according to claim 1, wherein during step a), said substrate of the lens is machined over at least a fraction of a thickness of the substrate.

9. The method according to the claim 8, wherein during step a), the substrate of the lens is machined over a fraction of its thickness that is less than or equal to 30 percent of the total thickness of said substrate.

10. The method according to claim 8 wherein, during step a), the coating film and at least a portion of the substrate are cut obliquely.

11. The method according to claim 10, wherein said oblique cutting is performed through the total thickness of the coating film and of the substrate.

12. The method according to claim 1, wherein the coating film and the substrate of the lens are cut in such a manner that at least 80 percent of the outline of the working central portion of the coating film is spaced apart from the edge of the face of the lens on which the coating film is secured by no more than 1 millimeter.

13. The method according to claim 1, wherein the first material is a mineral glass or a polymeric glass.

14. The method according to claim 1, wherein the coating film is a transparent plastic material.

15. The method according to claim 1, wherein the coating film is a polymer material presenting physicochemical properties or optical properties of birefrigence, polarization, or absorption in ultraviolet wavelengths or visible wavelengths so as to give a tint to the lenses.

16. The method according to claim 1, wherein the coating film has reflective or hydrophobic properties.

17. The method according to claim 1, wherein the coating film has one or more coating layers imparting anti-impact, anti-scratching, anti-reflection or anti-dirtying properties.

18. A method of shaping an ophthalmic eyeglass lens to have a desired outline corresponding to an outline of a frame in which the lens is to be mounted, comprising:
   a) a step of providing the lens presenting two main curved optical working faces and comprising firstly a substrate made of a first material and presenting two main curved faces corresponding to the two main faces of the lens, and secondly at least one coating film made of a material distinct from that of said substrate, said coating film being previously secured on at least one of the main faces of the substrate;
   b) a step of forming the edge face of the coating film by cutting the lens by machining the lens with a first tool over at least the thickness of the coating film previously secured on the substrate this cutting defining internally a working central portion of the coating film that presents a reduced outline of smaller size than the desired outline, this reduced outline being closed and determined as a function of said desired outline so as to be included within said desired outline;

c) a step of trimming the edge face of the substrate along said desired outline by machining by means of a second tool distinct from the first tool, without machining the working central portion of the coating film; and d) at least one subsequent step of finishing the edge face of the substrate by machining without machining the working central portion of the coating film.

19. The method according to claim 18, wherein during step d), beveling and/or grooving and/or chamfering operations are performed on the substrate of the lens.

20. The method according to claim 18, wherein steps b) and c) are performed sequentially, one after the other, in either order.

* * * * *